United States Patent
Knitt

(10) Patent No.: US 11,988,758 B2
(45) Date of Patent: May 21, 2024

(54) GLOBAL POSITIONING SYSTEM ASSISTED CRUISE CONTROL

(71) Applicant: Harley-Davidson Motor Company, Inc., Milwaukee, WI (US)

(72) Inventor: Andrew Alfred Knitt, Oconomowoc, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 973 days.

(21) Appl. No.: 16/444,697

(22) Filed: Jun. 18, 2019

(65) Prior Publication Data

US 2020/0400840 A1 Dec. 24, 2020

(51) Int. Cl.
*G01S 19/52* (2010.01)
*B60W 30/14* (2006.01)
*B60W 50/00* (2006.01)

(52) U.S. Cl.
CPC ........... *G01S 19/52* (2013.01); *B60W 30/143* (2013.01); *B60W 2050/0005* (2013.01); *B60W 2050/0019* (2013.01); *B60W 2050/0075* (2013.01); *B60W 2520/10* (2013.01); *B60W 2556/50* (2020.02); *B60Y 2400/303* (2013.01)

(58) Field of Classification Search
CPC ...... G01S 19/52; G01S 19/42; B60W 30/143; B60W 2556/50; B60W 2050/0005; B60W 2050/0019; B60W 2050/0075; B60W 2520/10; B60W 2300/36; B60W 2710/0644; B60W 2720/10; B60Y 2400/303
See application file for complete search history.

(56) References Cited

U.S. PATENT DOCUMENTS

| | | | |
|---|---|---|---|
| 7,460,950 B2 * | 12/2008 | Wurth | B60C 23/061 701/32.4 |
| 8,352,111 B2 | 1/2013 | Mudalige | |
| 8,996,273 B2 * | 3/2015 | Lee | G01C 21/20 701/96 |
| 9,272,711 B1 | 3/2016 | Sivaraman | |

(Continued)

OTHER PUBLICATIONS

Mike Monticello, "Guide to Adaptive Cruise Control", website: https://www.consumerreports.org/car-safety/adaptive-cruise-control-guide/, Consumer Reports, Jun. 29, 2017, 3 pages.

(Continued)

*Primary Examiner* — Aniss Chad
*Assistant Examiner* — Christopher George Fees
(74) *Attorney, Agent, or Firm* — Michael Best & Friedrich LLP

(57) ABSTRACT

A system for controlling the speed of a vehicle. The system includes a satellite receiver configured to determine a satellite navigation-based speed of the vehicle and one or more speed sensors configured to determine a sensor-based speed of the vehicle. The system further includes a controller having one or more electronic processors and in communication with the satellite receiver and the one or more speed sensors. The controller is configured to receive a desired set speed from a user, determine an actual speed of the vehicle based on the satellite navigation-based speed and the sensor-based speed, and control the vehicle such that the actual speed of the vehicle is equal to the desired set speed.

20 Claims, 6 Drawing Sheets

(56) References Cited

U.S. PATENT DOCUMENTS

| | | | |
|---|---|---|---|
| 9,381,917 B1 | 7/2016 | Dolgov et al. | |
| 9,665,102 B2 | 5/2017 | Switkes et al. | |
| 9,669,833 B2 | 6/2017 | Abdel-Rahman et al. | |
| 9,676,389 B2 | 6/2017 | Clarke et al. | |
| 9,997,077 B2 | 6/2018 | Oshida et al. | |
| 10,338,089 B2* | 7/2019 | Chakravarty | G01P 3/42 |
| 11,079,494 B2* | 8/2021 | Miyajima | G01S 19/23 |
| 11,169,278 B2* | 11/2021 | Zalewski | G01S 19/53 |
| 2009/0105923 A1* | 4/2009 | Etori | B60W 10/18 |
| | | | 701/96 |
| 2009/0326733 A1* | 12/2009 | Abele | G01P 21/02 |
| | | | 701/1 |
| 2010/0262396 A1* | 10/2010 | Kircher | G01C 22/004 |
| | | | 702/96 |
| 2012/0232793 A1* | 9/2012 | Hagiwara | G01C 21/28 |
| | | | 701/518 |
| 2014/0005908 A1* | 1/2014 | Kollberg | G01S 13/726 |
| | | | 701/96 |
| 2015/0134223 A1 | 5/2015 | Kim | |
| 2015/0260522 A1* | 9/2015 | Lei | G08G 1/052 |
| | | | 701/400 |
| 2016/0263998 A1* | 9/2016 | Induni | G01S 19/14 |
| 2017/0329348 A1* | 11/2017 | Li | G05D 1/0027 |
| 2018/0229729 A1* | 8/2018 | McQuillen | B60K 35/00 |
| 2018/0306836 A1* | 10/2018 | Mueller | G01P 7/00 |
| 2019/0064833 A1* | 2/2019 | Nance | B60W 30/14 |
| 2019/0236058 A1* | 8/2019 | Komala | H04L 67/535 |
| 2020/0401154 A1* | 12/2020 | Xiong | B60K 31/04 |
| 2021/0188270 A1* | 6/2021 | Horn | B62J 45/41 |
| 2021/0197816 A1* | 7/2021 | Horn | B62J 27/00 |

OTHER PUBLICATIONS

Man Truck Germany, "GPS-assisted Cruise Control", website: https://www.truck.man.eu/de/en/man-world/technology-and-competence/efficiency-systems/gps-assisted-cruise-control/GPS-assisted-Cruise-Control.html, accessed Dec. 26, 2018, 4 pages.

TheVog.Net(Victory Owner's Group), "Adaptive Cruise Control for Motorcycles", website: https://www.thevog.net/threads/adaptive-cruise-control-for-motorcycles.4247/, Jun. 14, 2009, 7 pages.

\* cited by examiner

GLOBAL POSITIONING SYSTEM ASSISTED CRUISE CONTROL

FIELD

The present disclosure relates Global Positioning System assisted ("GPS-assisted") cruise control for a vehicle, such as a motorcycle.

SUMMARY

Motorcycle riders may often travel together in groups. During long journeys, the riders may coordinate their speeds and set a speed of their individual motorcycles (or other vehicles) using a cruise control system. However, variations in motorcycles, components, sensors, and the like, can cause slight variations between the speeds of the different motorcycles in the group. These variations can cause distances between the motorcycles in the group to change over time (for example, increase or decrease). These changes require riders to change their set speeds to either increase their speeds or decrease their speeds, as needed. However, the variations between motorcycles continue to exist, which often requires riders to constantly adjust their speeds during a trip. This issue is compounded as the size of the group of riders increases, as multiple riders will modify their speed settings during the ride with no coordination of speed available.

Accordingly, embodiments described herein addresses these problems by using space-based navigation system, such as the Global Positioning System ("GPS"), to control vehicle speeds, such as part of a cruise control system.

In one aspect, a system for controlling the speed of a vehicle is described. The system includes a satellite receiver configured to determine a satellite navigation-based speed of the vehicle and one or more speed sensors configured to determine a sensor-based speed of the vehicle. The system further includes a controller having one or more electronic processors and in communication with the satellite receiver and the one or more speed sensors. The controller is configured to receive a desired set speed from a user, determine an actual speed of the vehicle based on the satellite navigation-based speed and the sensor-based speed, and control the vehicle such that the actual speed of the vehicle is equal to the desired set speed.

In another aspect, a method for controlling a speed of a motorcycle is disclosed, according to some embodiments. The method includes receiving, at an electronic processor, an indication of a desired speed. The method further includes receiving, at the electronic processor, a satellite navigation-based speed value from a satellite navigation receiver of the motorcycle, the satellite navigation receiver in communication with one or more navigation satellites. The method also includes receiving, at the electronic processor, a sensor-based speed value from one or more speed sensors. The method further includes comparing the satellite navigation-based speed value to the sensor-based speed value to determine a difference and generating an offset value based on the determined difference, via the electronic processor. The method also include applying the offset value to the sensor-based speed to generate a corrected actual speed and controlling the speed of the motorcycle such that the corrected actual speed is equal to the desired speed, via the electronic processor.

In yet another aspect, a motor cycle is disclosed, according to some embodiments. The motorcycle includes a Global Positioning Satellite (GPS) receiver configured to determine a GPS-based speed of the vehicle. The motorcycle also includes one or more speed sensors configured to determine a sensor-based speed of the vehicle, a user interface configured to receive inputs from a user, and a controller having one or more electronic processors and in communication with the GPS receiver and the one or more speed sensors. The controller is configured to receive an indication of a desired speed via the user interface, a GPS-based speed value from the GPS receiver, and a sensor-based speed value from the one or more speed sensors. The controller is further configured to compare the GPS-based speed value to the sensor-based speed value to determine a difference, and generate an offset value based on the determined difference. The controller is further configured to apply the offset value to the sensor-based speed to generate a corrected actual speed, and control the speed of the motorcycle such that the corrected actual speed is equal to the desired speed.

Other aspects of the disclosure will become apparent by consideration of the detailed description and accompanying drawings.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification may include processing components, such as one or more processors, one or more memory modules including non-transitory computer-readable medium, one or more input/output interfaces, and various connections (for example, a system bus) connecting the components. Also, although embodiments are described herein with reference to motorcycles, the embodiments are not limited in their use and may be used with any type of vehicle.

Figure 1:
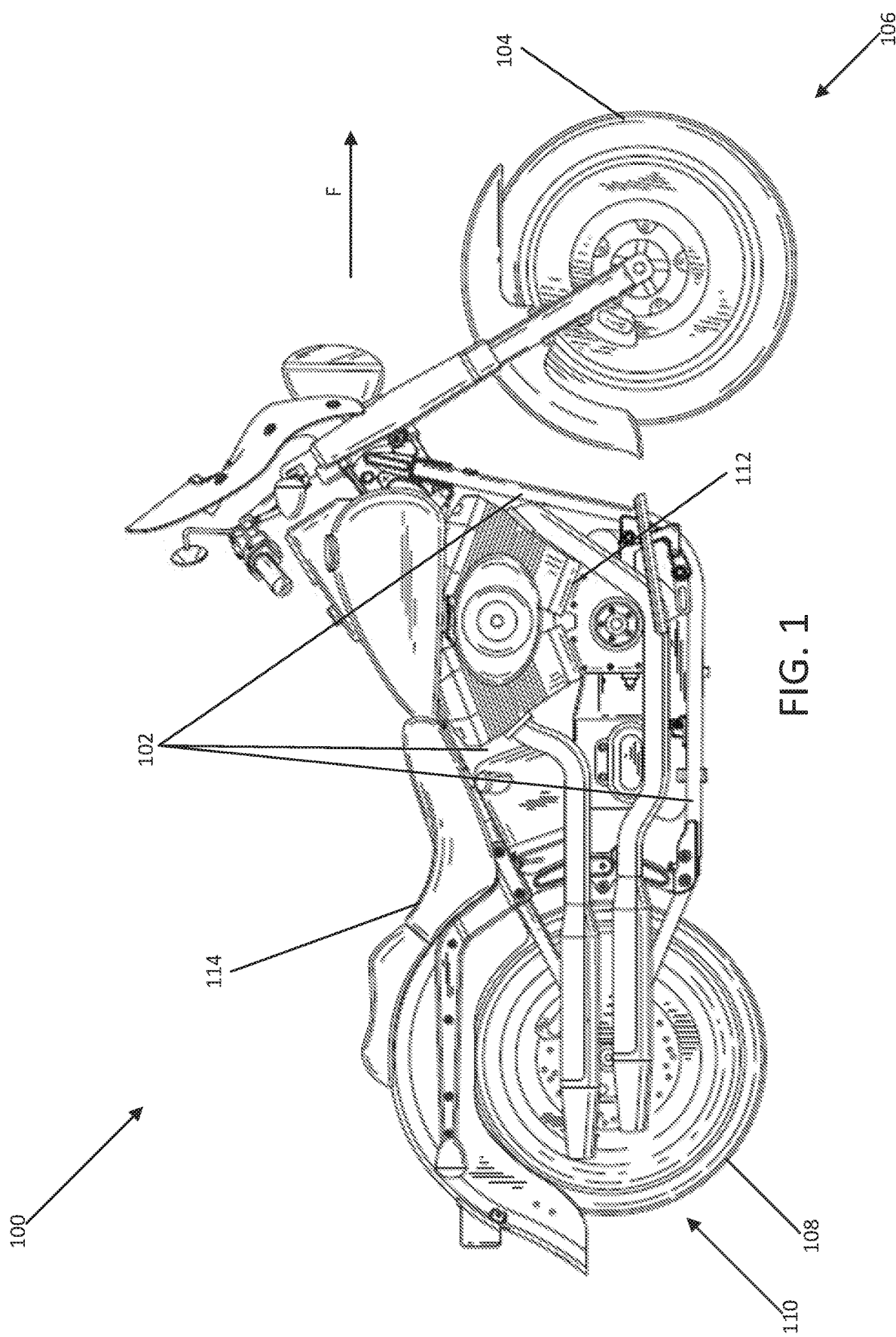
FIG. 1 is a side view of a motorcycle according to some embodiments.

FIG. 1 illustrates a motorcycle 100 including a frame 102, a front wheel 104 positioned at a front end 106 of the motorcycle 100, and at least one rear wheel 108 positioned at a rear end 110 of the motorcycle 100. A longitudinal center plane A (FIG. 2) of the motorcycle 100 divides the motorcycle 100 into left and right sides. A drive unit, such as an engine 112 in some embodiments, is configured to drive the at least one rear wheel 108 in a forward direction of travel F along the longitudinal center plane A of the motorcycle 100. In one embodiment, the engine 112 is an internal combustion engine. In other embodiments, the drive unit may be a hybrid engine (for example, internal combustion engine with inverter and electric motors), an electric drive unit, or other drive type. A seat 114 is provided for a rider. The seat 114 is coupled to the frame 102 between the front wheel 104 and the at least one rear wheel 108 and is positioned generally above the engine 112.

Figure 2:
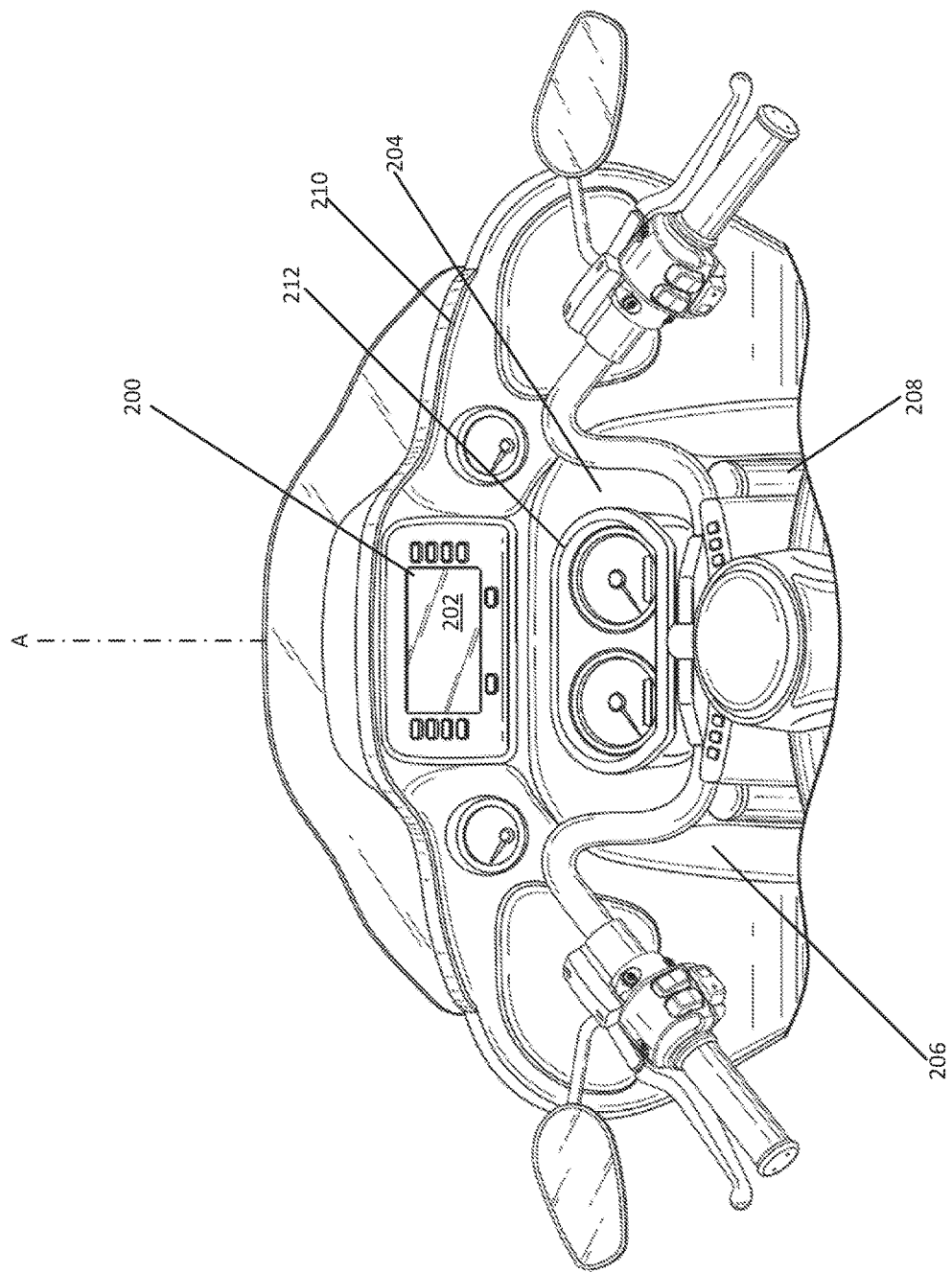
FIG. 2 is a rear view of a human machine interface and a handlebar assembly of the motorcycle of FIG. 1 according to some embodiments.

As illustrated in FIG. 2, the motorcycle 100 also includes a human machine interface, such as a console 200, having an optional display 202 and an instrument panel 212 for displaying information about the motorcycle 100 to a rider, such as traveling speed, an amount of fuel or battery raining, or other applicable information. The motorcycle 100 also includes a steering assembly 204 configured to steer the motorcycle 100 while the motorcycle 100 is traveling. The steering assembly 204 is coupled to the front wheel 104 and includes a handlebar assembly 206. The steering assembly 204 is pivotably coupled to the frame 102, and more particularly, to a front fork 208 of the frame 102 allowing a rider to maneuver the motorcycle 100 while traveling. A front fairing 210 is supported by the steering assembly 204 at the front end 106 of the motorcycle 100. The console 200 may be positioned inside the front fairing 210, as further illustrated in FIG. 1. In other embodiments, the front fairing 210 may be fixed relative to the frame 102 such that the steering assembly 204 pivots with respect to the front fairing 210. In yet other embodiments, for example in motorcycles without front fairings, the console 200 may be positioned elsewhere on the motorcycle 100 (for example, the console 200 may be positioned on a fuel tank, positioned directly on the steering assembly 204, or the like).

Figure 3:
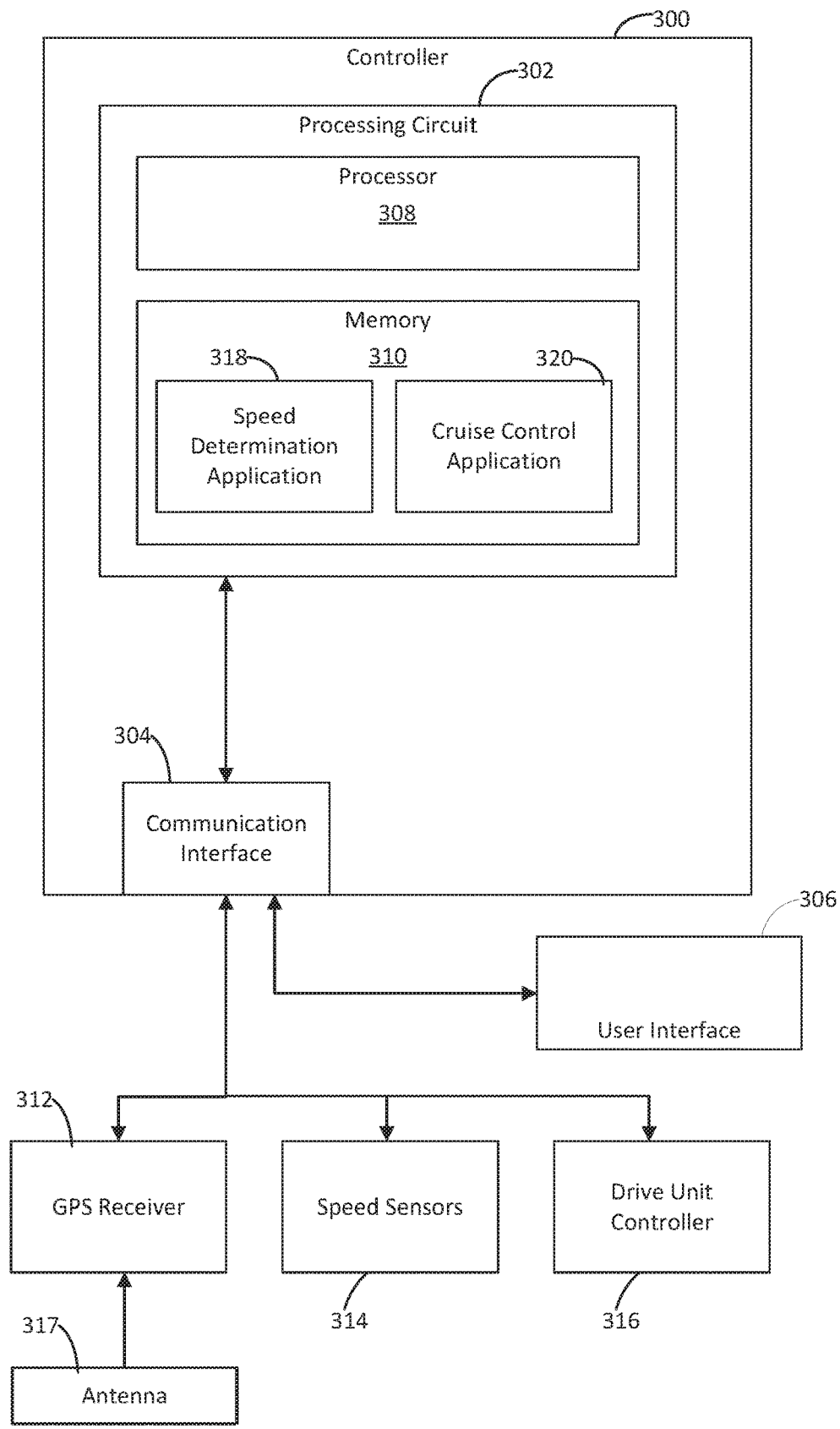
FIG. 3 is a schematic view of a control system of the motorcycle of FIG. 1 according to some embodiments.

The console 200 includes or communicates with a controller 300 included in the motorcycle 100. The controller 300 may be located within the console 200, such as within the fairing 210. The controller 300 is configured to control one or more systems of the motorcycle 100. For example, the controller 300 may be configured to control the power unit, either directly or by communicating with one or more intermediary devices, such as a dedicated engine control module (ECM). Also, while the controller 300 is shown as separate from other controllers on the motorcycle 100, it is understood that the functions performed by controller 300 may be performed by other controllers on the motorcycle, such as drive unit controller 316, described below. Additionally, the functions of the controller 300 may be performed by other controllers on the motorcycle 100, such as an engine control module (ECM) or a vehicle supervisory controller (VSC) for use with an electric vehicle (EV). Thus, the functions described herein that are performed by the controller 300 should not be limited to a separate controller, but should be understood to apply to any controller on the vehicle capable of performing the described functions. Turning now to FIG. 3, a schematic diagram of the controller 300 according to some embodiments is shown. As illustrated in FIG. 3, in some embodiments, the controller 300 includes a processing circuit 302, and a communication interface 304. The controller 300 may further be in communication with a user interface 306, such as via the communication interface 304. In some embodiments, the user interface 306 includes the display 202 described above. While shown as separate from the controller 300, in some embodiments, the user interface 306 may be integrated with the controller 300.

The processing circuit 302 is communicably connected to the communication interface 304. The processing circuit 302 includes one or more electronic processors 308 and a memory 310. The electronic processor 308 may be implemented as a programmable microprocessor, an application specific integrated circuit (ASIC), one or more field programmable microprocessor (FPGA), a group of processing components, or with other suitable electronic processing components.

The memory 310 (for example, a non-transitory, computer-readable medium) includes one or more devices (for example, RAM, ROM, Flash memory, hard disk storage, or the like) for storing data, computer code, or combinations thereof for completing or facilitating the various processes, layers, and modules described herein. The memory 310 may include database components, object code components, script components, or other types of code and information for supporting the various activities and information structure described in the present application. According to one example, the memory 310 is communicably connected to the electronic processor 308 via the processing circuit 302 and may include computer code for performing (via execution by the electronic processor 308) the processes described herein.

The communication interface 304 is configured to facilitate communication between the controller 300 and one or more external devices or systems. The communication interface 304 may communicate with the external devices or systems wirelessly, over a wired connection, or a combination thereof. For example, in some embodiments, the communication interface 304 includes a wired interface, such as a Controller Area Network (CAN bus) interface for communicating with components included in the motorcycle 100. In other examples, the wired interface may include other types of wired interfaces, such as Universal Serial Bus (USB) interfaces, USB-C interfaces, serial (RS-232), or the like. In other examples, the communication interface 304 may include a wireless interface, such as cellular transceiver, a Bluetooth transceiver, a radio frequent (RF) transceiver, a Wi-Fi transceiver, and the like for communicate with components included in or external to the motorcycle 100.

As shown in FIG. 3, the communication interface 304 may communicate with a Global Positioning System (GPS) receiver 312 installed in or otherwise mounted on or carried by the motorcycle 100 and configured to communicate with one or more GPS satellites. The GPS receiver 312 is configured to provide location data and speed data based on data received via the one or more GPS satellites. While described as communicating with satellites included in the Global Positioning System (GPS), the receiver 312 associated with the motorcycle 100 may be configured to work with other types of space-based (satellite-based) navigation systems, such as a Global Navigation Satellite System (GLONASS).

Figure 4:
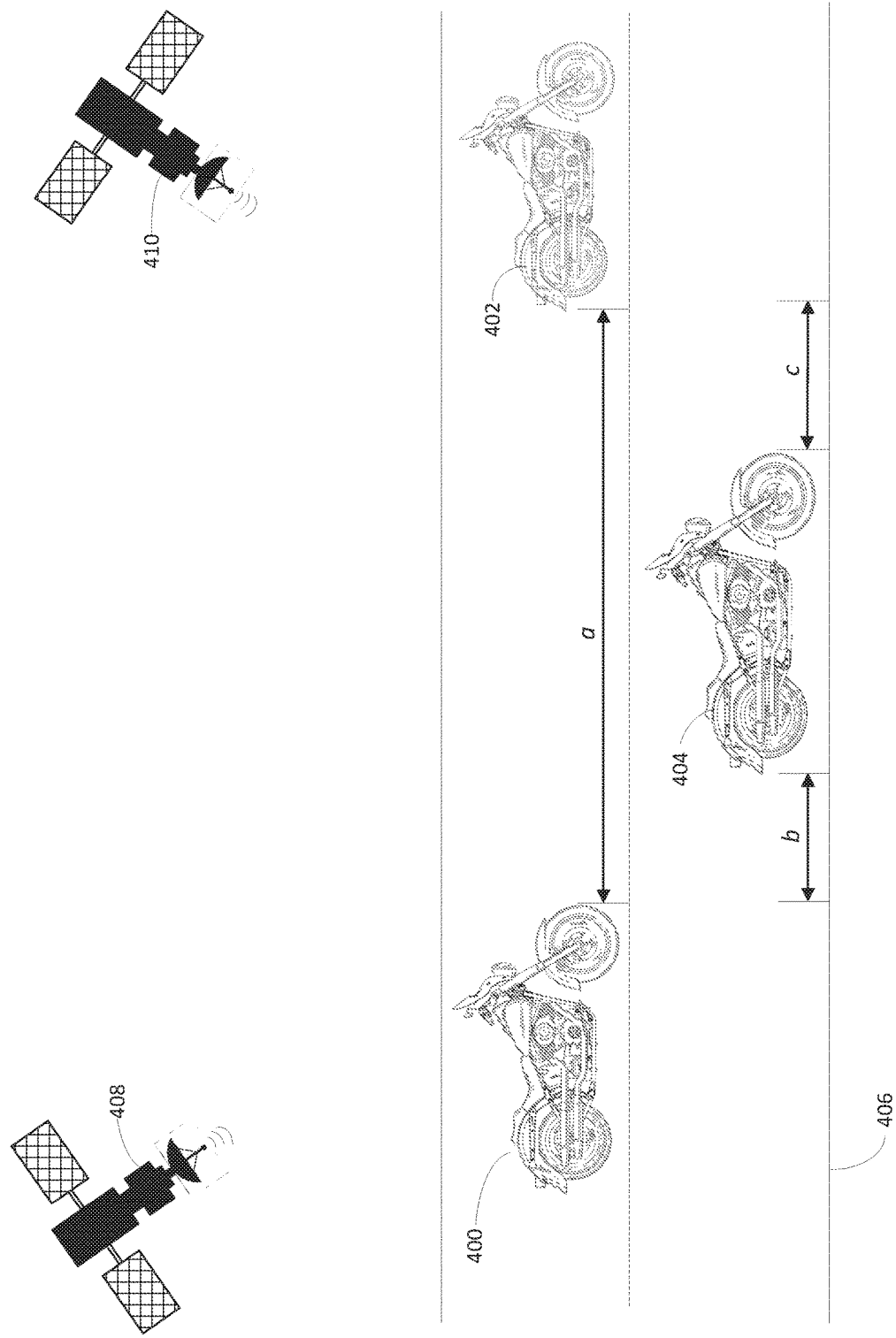
FIG. 4 is a system view of multiple motorcycles riding in a group and in communication with a global positioning system (GPS) according to some embodiments.

As illustrated in FIG. 4, the GPS receiver 312 includes or is communicatively coupled to an antenna 317. The antenna 317 is configured to receive signals from one or more global positioning satellites and transmit the received signals to the GPS receiver 312 (for example, a processing circuit included in the GPS receiver 312). In some embodiments, the antenna 317 may be mounted to the frame 102 or other portion of the motorcycle 100. In one embodiment, the antenna 317 is positioned on the motorcycle such that it can have a limited or unobstructed view of the sky to allow for receiving data from the global positioning satellites. It should be understood that, in some embodiments, the GPS receiver 312 is included in a smart phone or device carried or worn by a rider of the motorcycle 100. In this configuration, the GPS receiver 312 may communicate location information to the controller 300 via the communication interface 304. It should also be understood that the GPS receiver 312 and the communication interface 304 may communicate via one or more intermediary devices not illustrated in FIG. 3 for sake of simplicity.

As illustrated in FIG. 3, the communication interface 304 may also communicate with one or more on-board speed sensors 314 and a drive unit controller 316. In one embodiment, the on-board speed sensors 314 may communicate directly to the drive unit controller 316. In other embodiments, the on-board speed sensors 314 may be directly coupled to the controller 300, such as via an input/output (I/O) interface of the controller 300.

The speed sensors 314 are configured to provide an indication of the speed of the motorcycle 100. Speed sensors 314 may utilize eddy current detection sensors, or rotational speed sensors, such as Hall effect sensors to determine a rotational speed of a drive shaft or other rotating portion of the motorcycle 100, which can then be converted into a speed of the motorcycle. The output from the speed sensors 314 provides an on-board speed measurement.

The drive unit controller 316 is configured to control a speed of the motorcycle 100 by controlling a drive unit included in the motorcycle 100, such as the engine 112. In one embodiment, the drive unit controller 316 receives a speed command via a manual throttle device operated by a rider of the motorcycle and is communicate with one or more components of the engine 112 to control the engine 112 per the speed command. The drive unit controller 316 may further be configured to receive a speed command via the controller 300. For example, when operating in a cruise control mode, the controller 300 may provide a speed command to the drive unit controller 316 to obtain a desired speed. The drive unit controller 316 may also be configured to provide engine data (for example, temperature, revolutions per minute, and the like) to the controller 300. As described above, in some embodiments, the drive unit controller 316 may be integrated into the controller 300 and/or perform the functions of the controller 300, as described herein. Thus, in some embodiments, the desired speed may be directly provided to the drive unit controller 300.

As described above, the GPS receiver 312 is configured to receive data from a space-based navigation system, such as the Global Positioning System (GPS) including one or more positioning satellites 408, 410, as shown in FIG. 4. Using signals transmitted by the positioning satellites 408, 410, the GPS receiver 312 determines a location of the motorcycle 100 and may also determine other information, such as speed, altitude, and the like. In one embodiment, the GPS receiver 312 displays the determined position of the motorcycle 100 via the user interface 306, such as overlaid on a map. The GPS receiver 312 determines the location of the motorcycle 100 by using one or more standard methods of interpreting data received from positioning satellites, such as, for example, trilateration.

In one embodiment, the GPS receiver 312 also determines a speed of the motorcycle 100 by determining a change in the motorcycle's geographic position over time. For example, if the GPS receiver 312 determines that the motorcycle 100 has traveled 880 feet in 10 seconds, the GPS receiver 312 can determine that the motorcycle is traveling at approximately 60 miles per hour (mph). In other embodiments, the GPS receiver 312 determines a speed of the motorcycle 100 by determining a Doppler shift in the frequency received from one or more global positioning satellites. The Doppler shift may include the vector sum of a satellite's orbital velocity (approximately 7 kilometers per second), the rotational velocity of the Earth (approximately 400 meters per second at the equator), plus the motion of the motorcycle 100. Doppler shift speed measurements generally have a sub-meter per second accuracy.

As described above, the memory 310 included in the processing circuit 302 may be configured to store various processes, layers, and modules, which may be executed by the electronic processor 308. In one embodiment, the memory 310 includes a speed determination application 318 and a cruise control application 320. The speed determination application 318 may be configured to (when executed by the one or more electronic processors 308) determine a speed of the motorcycle 100 based on input from multiple sources, such as the GPS receiver 312 and the speed sensors 314. By combining multiple sources of the speed, variations in the vehicle, such as tire wear, tire inflation, manufacturing and calibration variability, etc., may be accounted for. Further, by relying on both GPS based speed data and speed sensor data, deficiencies in relying on GPS-based speed alone can be addressed. GPS-based speed deficiencies may include errors caused by obstructions preventing the GPS receiver 312 from receiving data, as well the longer latency associated with GPS-based speed data. This speed data may be provided to other systems or applications, such as the cruise control application 320 and/or the drive unit controller 316. It should be understood that the configuration of applications illustrated in FIG. 3 and described herein is provided as one example. In other examples, fewer or additional applications may be used to provide the functionality described here as being performed by the applications 318 and 320.

The cruise control application 320 is configured (when executed by the one or more electronic processors 308) to receive a set speed for the motorcycle from a rider of the motorcycle 100, which is then maintained by the cruise control application 320. The cruise control application 320 may control the speed of the motorcycle 100 by providing control signals to the drive unit controller 316 based on feedback received from the speed determination application 318. For example, the cruise control application 320 may use one or more types of closed loop control, such as proportional-integral-derivative (PID), proportional-derivative (PD), proportional-integral (PI), or other applicable closed loop control types to control and maintain the speed of the motorcycle 100. The cruise control application 320 may further be in communication with the user interface 306. For example, a rider may set the desired speed via the user interface 306. In other embodiments, the cruise control application 320 may also display the desired speed and/or the actual speed via the user interface 306.

Turning now to FIG. 4, a system diagram shows a number of motorcycles 400, 402, 404 travelling along a roadway 406. Each of the motorcycles 400, 402, 404 may include a GPS receiver, such as GPS receiver 312 described above. Each GPS receiver 312 on the motorcycles 400, 402, 404 receives information from one or more GPS satellites, such as GPS satellites 408, 410.

As shown in FIG. 4, multiple motorcycles, such as motorcycles 400, 402, 404, may often desire to travel together. For example, a number of motorcycle riders may ride in a group. During long journeys, the riders may use cruise control to maintain a speed of the individual motorcycles. In some instances the motorcycles, such as motorcycles 400, 402, 404, and their riders may coordinate the speeds that they desire to travel, and set their cruise control systems accordingly. For example, each rider may set their cruise control speed to 60 miles per hour (mph). By each rider setting the cruise control setting on their respective motorcycles, they hope to maintain a set distance between each motorcycle in the group. For example, as shown in FIG. 4, the individual riders will coordinate their speed settings to maintain respective distances a, b, and c. However, to maintain distances a, b, and c, it is required that each motorcycle 400, 402, 404 have an accurate speed measurement. Even minute variations in speed between motorcycles 400, 402, 404 can cause distances a, b, and/or c to change, requiring the riders to perform one or more operations to adjust their speed, such as by modifying their cruise control speed setting, manually speeding up or slowing down using typical throttle controls, or the like. However, even modifying the speed setting in the cruise control application cannot overcome inaccurate speed readings or other discrepancies between speed readings determined by each of the motorcycles 400, 402, and 404.

For example, if motorcycle 400 has an error of +0.5 mph between the measured speed and the actual speed, and if both motorcycle 400 and 402 have their cruise control application set to the same speed (for example, 55 mph), then over time motorcycle 400 will lessen the distance a between motorcycle 400 and motorcycle 402, assuming the actual speed of motorcycle 402 is equal to the measured speed. Upon the distance a becoming noticeably smaller than desired, the rider of motorcycle 400 may notice and decide to decrease the speed of motorcycle 400 by an increment of 1 mph, thereby setting the speed to 54 mph. However, assuming the speed of motorcycle 402 stays constant, motorcycle 400 will now be traveling 0.5 mph slower than motorcycle 402, thereby causing distance a to increase over time. This effect is known as "rubber banding" and may become more severe as the number of motorcycles in a group increases, due to multiple riders having to repeatedly adjust the speed of their motorcycles.

The actual speed of a motorcycle may be different than the measured speed due to many factors. For example, user modifications such as non-factory tires or wheels, tire wear, tire pressure, speed sensor calibrations, etc.

Figure 5:
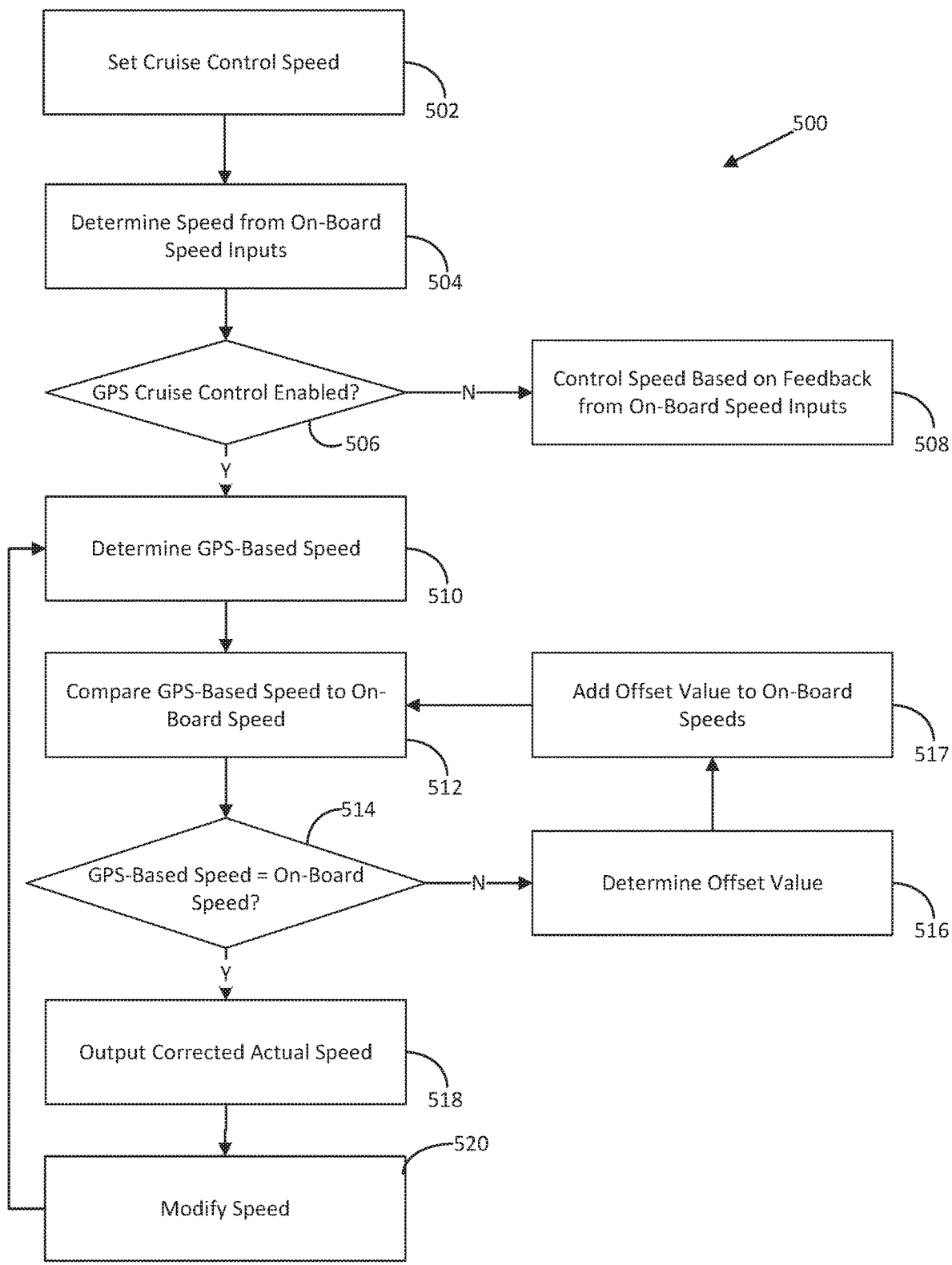
FIG. 5 is a flow chart illustrating a process for controlling the speed of a motorcycle using GPS-assisted cruise control according to some embodiments.

Turning now to FIG. 5, a flow-chart illustrating a process 500 for providing GPS-assisted cruise control is shown, according to some embodiments. The process 500 is described as being implemented using the controller 300 (the electronic processor 308 executing instructions) described above. However, it is contemplated that other controllers and/or control systems could also implement the below process. As described above, accurate speed measurements are important when multiple motorcycles are riding in a group to avoid rubber banding or the need to constantly change the speed in a cruise control application to maintain desired distances between motorcycles. Using the process 500 described below, the normal speed sensors on a motorcycle can be supplemented or corrected using GPS-based speed data.

As illustrated in FIG. 5, at process block 502, the cruise control speed is set to a given speed. For example, a rider may set the desired speed via the user interface 306, which in turn communicates the desired speed to the cruise control application 320. After the cruise control speed is set, the speed determination application 318 determines the speed of the motorcycle based on speed inputs received from on-board speed sensors 314 (at block 504). The controller 300 also determines whether the GPS-assisted cruise control function is enabled or available on the motorcycle 100 (at block 506). In some embodiments, the rider may be configured to turn the GPS-assisted cruise control function on or off, such as through the user interface 306. Also, in some embodiments, the GPS-assisted cruise control function may be turned on or off automatically based on the status of motorcycle 100, such as whether the motorcycle 100 includes the GPS receiver 312, whether the GPS receiver 312 is operating properly or has experienced a fault or error, or the like.

In response to the GPS-assisted cruise control function being disabled (at block 506), the cruise control application 320 controls the speed of the motorcycle based solely on the on-board speed input from the speed sensors 314 at process block 508. Thus, the cruise control application 320 may use standard cruise control methods to control the speed of the motorcycle.

Alternatively, in response to the GPS-assisted cruise control function being enabled (at block 506), the controller 300 determines the GPS-based speed at process block 510. In one embodiment, the speed determination application 318 determines the GPS-based speed based on data received from the GPS receiver 312. For example, the GPS receiver 312 may provide a GPS-based speed value directly to the speed determination application 318. For example, the GPS receiver 312 may provide the GPS-based speed value directly to the speed determination application 318 via the communication interface 304. In some embodiments, the GPS receiver 312 periodically provides the GPS-based speed value to the speed determination application 318. For example, the GPS receiver 312 may output a GPS-based speed value every one second. However, it is contemplated that the GPS receiver 312 may output a GPS-based speed value at a period of less than every second, or more than every second. In some embodiments, the controller 300 and/or the GPS receiver 312 may filter the GPS-based speed value to reduce potential errors in the GPS-based speed value. Errors in the GPS-based speed value may be due to overhead obstructions interrupting the signal received by the GPS receiver 312.

At process block 512, the controller 300 compares the GPS-based speed value to the on-board speed sensor speed value. In one embodiment, the speed determination application 318 compares the GPS-based speed value to the on-board speed sensor speed value. At process block 514, the speed determination application 318 determines whether the GPS-based speed value is equal to the on-board speed sensor speed value. In one embodiment, the speed determination application 318 determines that the GPS-based speed value is equal to the on-board speed sensor speed value when the difference between the two is less than 0.05 mph. In other embodiments, the speed determination module determines that the GPS-based speed value is equal to the on-board speed sensor speed value when the difference between the two is less than 0.01 mph. In still further embodiments, the speed determination module determines that the GPS-based speed value is equal to the on-board speed sensor speed value when the difference between the two is less than 0.1 mph.

In response to the GPS-based speed value not being equal to the on-board speed sensor speed value, the controller 300 determines an offset value for the on-board speed value at process block 516. The offset value may be the difference in speed between the GPS-based speed value and the on-board speed sensor speed value. For example, when the GPS-based speed value is 55 mph, and the on-board speed sensor speed value is 54.5 mph, the offset value is 0.5 mph. After the offset value is determined at process block 516, the on-board sensor speed value is updated at process block 517 by applying the determined offset value to the on-board speed sensor speed values. The updated on-board speed sensor value can then be used to automatically control the speed of the vehicle as described below. However, as illustrated in FIG. 5, in some embodiments, before an offset is used as part of speed control, the controller 300 may wait for a steady state, such as by checking whether one or more subsequent GPS-based speed values and sensor-based speeds values match given the determined offset.

Alternatively, the controller 300 may be configured to determine a scaling value for the on-board speed value instead of an offset value. For example, the controller 300 may determine a scaling factor for the on-board speed value by dividing the GPS-based speed value by the on-board speed sensor value. This scaling factor may then be used to determine a corrected speed by multiplying an on-board speed value by the determined scaling factor.

Returning to process block 514, after determining an offset, the speed determination application 318 generates a corrected actual speed at process block 518, which is the result of adding the determined offset to the sensor-based speed value. In one embodiment, the speed determination application 318 generates the corrected actual speed, which is then received by the cruise control application 320. In other examples, the corrected actual speed generated by the speed determination application 318 is stored in the memory 310.

The cruise control application 320 uses the received corrected actual speed to modify the actual speed of the motorcycle to match the set speed at process block 520. For example, the cruise control application 320 may adjust the speed of the motorcycle by instructing the drive unit controller 316 to increase or decrease the rotational speed of the drive unit, such as the engine 112. The cruise control application 320, after adjusting the actual speed of the motorcycle at process block 520, continues to monitor the PGS-based speed at process block 510.

In some examples, the process 500 may return to process block 512 to again compare the GPS-based speed to the on-board speed sensor speed at process block 512 (immediately) after the cruise control application 320 modifying the speed of the motorcycle. In some embodiments, the GPS-based speed is provided by the GPS receiver 312 to the speed determination application 318 every second. However, in other embodiments, the GPS receiver 312 may provide the GPS-based speed to the speed determination application 318 at intervals less than one second or more than one second. In certain examples, the GPS receiver 312 may provide the GPS-based speed to the speed determination application 318 even when the cruise control is not active, thereby allowing the speed determination application 318 to constantly determine an accurate actual speed when the motorcycle 100 is in operation.

For example, the speed determination application 318 may determine a updated offset or scaling values when the motorcycle speed is maintained at a constant speed (for example, a steady state) for a predetermined amount of time, when the cruise control is not activated. In one specific example, the predetermined amount of time may be one minute. However, predetermined times of more than one minute or less than one minute are also contemplated. Accordingly, in some embodiments, a determined offset or scaling factor is applied to the on-board sensor speed values for the predetermined time rechecking the accuracy of the offset by comparing sensor speed value (as updated with the offset) to a current GPS-based speed value (at block 512). If the speeds values do not match, a new offset can be determined as described above (at block 516). As noted above, in some embodiments, the time that an offset is used before checking for an update may be defined based on a frequency of obtaining GPS-based speed values. Also, in some embodiments, the offset value may be based on a historical of differences as compared to a difference between a discrete sensor-based speed value and a discrete GPS-based speed value. For example, the offset may be determined based on a rolling average of differences, which may reset for each trip or based on other triggers. Also, in some embodiments, in situations when a GPS-based speed value cannot be determined, such as when the GPS receiver 312 cannot communicate with the satellites 408, 401 (a loss-of-signal condition) or when the vehicle is operating under heavy acceleration or deceleration (for example, accelerating or decelerating faster than the GPS can update the speed), the most recently determined offset may be used in a static state. In one embodiment, the current offset or scaling factor is applied to the on-board speed signal until an updated offset or scaling factor is determined.

Figure 6:
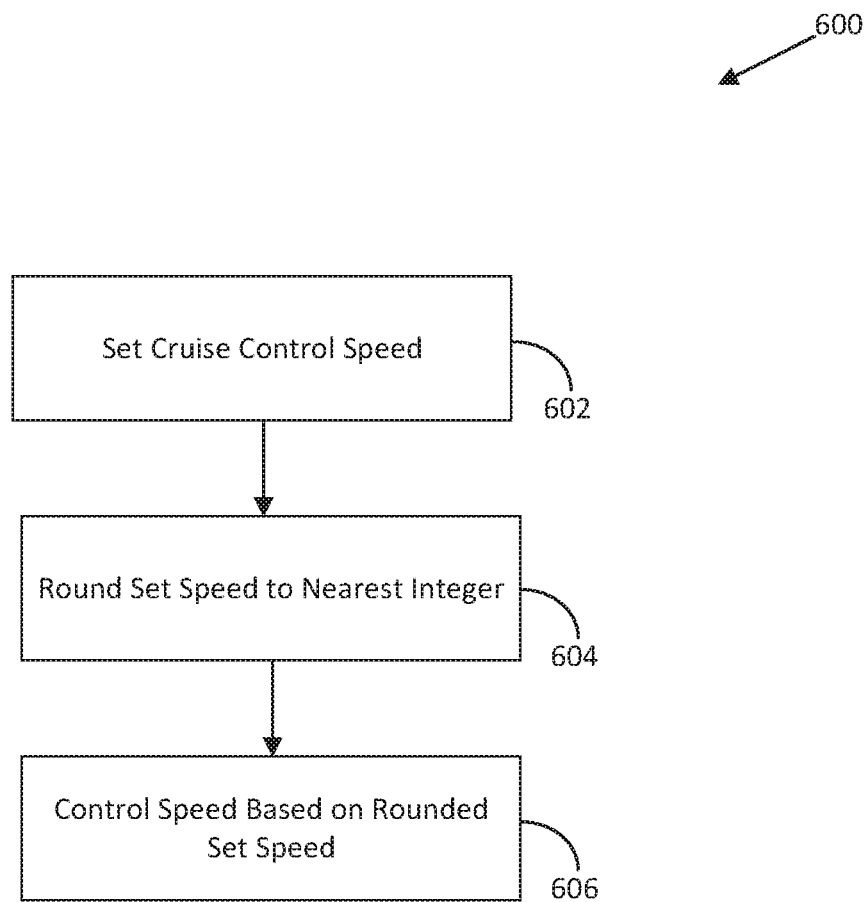
FIG. 6 is a flow chart illustrating a process for controlling the speed of a motorcycle using a whole integer speed rounding process according to some embodiments.

Turning now to FIG. 6, a process 600 for rounding a speed of the motorcycle to an integer (for example, whole number) when in a cruise control mode is shown according to some embodiments. The process 600 may be used as an alternate method for assisting motorcycle riders to maintain a common speed with other riders. In other embodiments, the process 600 may be used in conjunction with the process 500 described above. For example, the process 600 may be used to automatically round the set speed to the nearest integer when the speed is set by the user. This rounded speed may be provided to the user, such as via user interface 306, to allow the user to know what the set speed is. This can be beneficial when multiple motorcycles are coordinating their speed, as it insures that each motorcycle has set the desired speed to an integer, so that each rider can easily ensure that the set speed matches the set speed of all other riders. For example, in some cruise control systems, the speed may be set to the nearest tenth of a speed unit (for example, miles-per hour, kilometers-per-hour, and the like), but the user may only see the nearest whole number being displayed. Further, if the motorcycle does not include a digital speed indicator, each rider may have difficulty setting their speed to an exact desired speed using an analog speed indicator. Thus, by rounding the set speed to the nearest integer, a user or group of users may be able to easily coordinate their speeds by having the set speeds automatically rounded to the nearest integer.

At process block 602, the cruise control speed is set to a given speed. For example, a user may set the desired speed via the user interface 306, which in turn communicates the desired speed to the cruise control application 320. The cruise control application 320, in response to receiving the desired speed, rounds the set speed to the nearest integer (for example, a whole number) at process block 604. In some embodiments, the cruise control application 320 rounds up to the nearest integer. For example, when the speed is set at 55.3 mph, the cruise control application 320 rounds up to 56 mph. In other embodiments, the cruise control application 320 rounds down to the nearest integer. For example, when the speed is set at 55.8 mph, the cruise control application 320 rounds down to 55 mph. In still further embodiments, the cruise control application 320 may round up or down to the nearest integer. For example, set speeds of 55.1 mph-55.4 mph may be rounded to 55 mph, and set speeds of 55.5 mph-55.9 mph may be round to 56 mph. In other examples, other rounding schemes are also contemplated.

After rounding the set speed to the nearest integer at process block 604, the cruise control application 320 controls the speed of the motorcycle based on the rounded set speed at process block 606. In one example, the cruise control application 320 may control the speed using the process 500 described above. In other examples, the cruise control application 320 may control the speed using one or more known cruise control methods to control the speed to the rounded set speed.

Accordingly, embodiments described herein address inaccuracies and inconsistencies between speed control systems, such as cruise control systems in vehicles, such as motorcycles. These inaccuracies and inconsistencies can cause difficulties when a rider is attempting to maintain a constant speed within another vehicle or other point of reference. In particular, the described GPS-assisted cruise control and rounded set speed cruise control functions address these and other issues. Various features and advantages of the disclosure are set forth in the following claims.

What is claimed is:

1. A speed control system for a vehicle, the system comprising:
   a satellite receiver configured to determine a satellite navigation-based speed of the vehicle;
   one or more speed sensors configured to determine a sensor-based speed of the vehicle;
   a controller having one or more electronic processors and in communication with the satellite receiver and the one or more speed sensors, the controller configured to:
      receive a desired set speed from a user;
      determine whether a GPS-assisted cruise control feature is enabled based on input from a user;
      in response to determining that the GPS-assisted cruise control function is not enabled based on the input from the user:
         perform cruise control to control the speed of the vehicle using solely the sensor-based speed; and
      in response to determining that the GPS-assisted cruise control function is enabled based on the input from the user:
         determine an actual speed of the vehicle based on the satellite navigation-based speed and the sensor-based speed; and
         control the vehicle such that the actual speed of the vehicle is equal to the desired set speed,
         wherein the controller is configured to determine the actual speed of the vehicle by:
            comparing the satellite navigation-based speed and the sensor-based speed to determine a speed difference;
            generating an offset value based on the difference between the satellite navigation-based speed and the sensor-based speed, wherein the offset value is the speed difference;
            applying the offset value to one or more subsequent sensor-based speed values for a predetermined period of time and, thereafter, checking an accuracy of the offset value by comparing a current sensor-based speed value, as updated with the offset value, to a current GPS-based speed value; and
            in response to the current sensor-based speed value, as updated with the offset value, and the current GPS-based speed value not matching, determining a new offset value.

2. The system of claim 1, wherein the controller is in communication with an engine controller to control a speed of an engine of the vehicle, wherein controlling the speed of the engine controls the speed of the vehicle.

3. The system of claim 1, wherein the controller is configured to apply the offset value to the one or more subsequent sensor-based speed values for the predetermined period of time by adding the offset value to each of the one or more subsequent sensor-based speed values.

4. The system of claim 1, wherein the controller is further configured to continually apply the offset value after the predetermined time period in response to acceleration values of the vehicle.

5. The system of claim 1, wherein the satellite navigation receiver determines the satellite navigation-based speed of the vehicle by determining a difference in position over time.

6. The system of claim 1, wherein the satellite navigation receiver determines the satellite navigation-based speed of the vehicle by determining a Doppler shift in a frequency received from one or more satellites.

7. A method for controlling the speed of a motorcycle, comprising:
   receiving, at an electronic processor, an indication of a desired speed;
   receiving, at the electronic processor, a satellite navigation-based speed value from a satellite navigation receiver of the motorcycle, the satellite navigation receiver in communication with one or more navigation satellites;
   receiving, at the electronic processor, a sensor-based speed value from one or more speed sensors;

determining, at the electronic processor, whether a GPS-assisted cruise control feature is enabled based on input from a user;

in response to determining that the GPS-assisted cruise control function is not enabled based on the input from the user:
  performing cruise control to control the speed of the vehicle using solely the sensor-based speed; and in response to determining that the GPS-assisted cruise control function is enabled based on the input from the user:
  determining, at the electronic processor, a scaling factor by dividing the satellite navigation-based speed value by the sensor-based speed value; and
  multiplying, via the electronic processor, the scaling factor by the sensor-based speed to generate a corrected actual speed;
  controlling, via the electronic processor, the speed of the motorcycle such that the corrected actual speed is equal to the desired speed;
  before generating the corrected actual speed, waiting for a difference between a plurality of satellite navigation-based speed values and a plurality of associated sensor-based speed values to match the scaling factor and thereafter multiplying the scaling factor by the sensor-based speed to obtain the corrected actual speed;
  using the scaling factor for a predetermined time before checking for an update; and
  in response to receiving an indication of a loss of signal from the satellite navigation receiver of a loss of signal, using the scaling factor in a static state.

8. The method of claim 7, further comprising:
rounding the desired speed to an integer value; and
updating the desired speed with the rounded desired speed.

9. The method of claim 8, wherein rounding the desired speed to an integer value comprises rounding the desired speed down to the nearest integer value.

10. The method of claim 8, wherein rounding the desired speed to an integer value comprises rounding the desired speed up to the nearest integer value.

11. The method of claim 7, wherein the satellite navigation receiver determines the satellite navigation-based speed value by determining a difference in position over time.

12. The method of claim 7, wherein the satellite navigation receiver determines the satellite navigation-based speed value by determining a Doppler shift in a frequency received from the one or more navigation satellites.

13. The method of claim 7, wherein controlling the speed of the motorcycle comprises regulating a rotational speed of an engine, wherein the speed of the engine controls the speed of the motorcycle.

14. The method of claim 7, further comprising, in response to detecting the vehicle accelerating or decelerating faster than the GPS-based speed value can be updated, using the scaling factor in a static state.

15. A motorcycle comprising:
a Global Positioning Satellite (GPS) receiver configured to determine a GPS-based speed of the motorcycle;
one or more speed sensors configured to determine a sensor-based speed of the motorcycle;
a user interface configured to receive inputs from a user; and
a controller having one or more electronic processors and in communication with the GPS receiver and the one or more speed sensors, wherein the controller is configured to:
  receive an indication of a desired speed via the user interface;
  receive a GPS-based speed value from the GPS receiver;
  receive a sensor-based speed value from the one or more speed sensors;
  determine whether a GPS-assisted cruise control feature is enabled based on input from the user;
  in response to determining that the GPS-assisted cruise control function is enabled based on the input from the user:
    compare the GPS-based speed value to the sensor-based speed value to determine a difference;
    generate an offset value based on the determined difference;
    in response to a difference between one or more subsequent GPS-based speed values and one or more subsequent sensor-based speed values matching the generated offset value, apply the offset value to the sensor-based speed to generate a corrected actual speed; and
    control the speed of the motorcycle such that the corrected actual speed is equal to the desired speed; and
  in response to determining that the GPS-assisted cruise control function is not enabled based on the input from the user:
    perform cruise control to control the speed of the motorcycle using solely the sensor-based speed value.

16. The motorcycle of claim 15, wherein the controller is further configured to:
round the desired speed to the nearest integer value; and
update the desired speed with the rounded desired speed.

17. The motorcycle of claim 15, wherein the GPS receiver determines the GPS-based speed value by determining a Doppler shift in a frequency received from one or more GPS satellites.

18. The motorcycle of claim 15, wherein the controller is configured to determine that the GPS-assisted cruise control function is enabled based on input received via the user interface turning on the GPS-assisted cruise control function as part of a group ride.

19. The motorcycle of claim 15, wherein the controller is further configured to determine that the GPS-assisted cruise control function is not enabled based on the GPS-assisted cruise control function being automatically turned off in response to the GPS receiver experiencing a fault.

20. The motorcycle of claim 15, wherein the controller is configured to perform cruise control to control the speed of the motorcycle using solely the sensor-based speed value, in response to determining that the GPS-assisted cruise control function is not enabled, by controlling the speed of the motorcycle such that the sensor-based speed value is equal to the desired speed.

* * * * *